United States Patent
Morita et al.

(10) Patent No.: US 8,141,349 B2
(45) Date of Patent: Mar. 27, 2012

(54) EXHAUST EMISSION CONTROL DEVICE AND METHOD FOR INTERNAL COMBUSTION ENGINE, AND ENGINE CONTROL UNIT

(75) Inventors: Tomoko Morita, Saitama-ken (JP); Norio Suzuki, Saitama-ken (JP); Katsuji Wada, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1182 days.

(21) Appl. No.: 11/979,169

(22) Filed: Oct. 31, 2007

(65) Prior Publication Data
US 2008/0120963 A1    May 29, 2008

(30) Foreign Application Priority Data
Nov. 24, 2006   (JP) .................................. 2006-317853

(51) Int. Cl.
*F01N 3/00*      (2006.01)
(52) U.S. Cl. ................ 60/286; 60/274; 60/285; 60/295; 60/301; 60/303
(58) Field of Classification Search .................... 60/276, 60/277, 285, 286, 295, 301, 303
See application file for complete search history.

(56) References Cited

U.S. PATENT DOCUMENTS
7,111,451 B2 *   9/2006   Dou et al. ........................ 60/285
7,246,486 B2 *   7/2007   Nakagawa et al. ............. 60/285

FOREIGN PATENT DOCUMENTS
JP      2003-003882 A    1/2003
WO   WO 2004/097200 A1   11/2004

* cited by examiner

*Primary Examiner* — Thomas Denion
*Assistant Examiner* — Diem Tran
(74) *Attorney, Agent, or Firm* — Arent Fox LLP (57) ABSTRACT

An exhaust emission control device for an internal combustion engine, which is capable of supplying a just enough amount of reducing agent to the NOx catalyst even when a catalyst is provided on an upstream side of the NOx catalyst. A catalyst and a NOx catalyst are disposed at respective upstream and downstream locations in an exhaust system, for purifying NOx and for trapping NOx under an oxidizing atmosphere and reducing the NOx under a reducing atmosphere, respectively. An air-fuel sensor is disposed between the catalyst and the NOx catalyst. A reducing agent is supplied to an upstream side of the catalyst, to control exhaust gases such that the gases form the reducing atmosphere. To determine time of termination of NOx reduction control, an amount of reducing agent supplied to the NOx catalyst is calculated, and calculation of the amount of reducing agent is started when the air-fuel ratio has converged within a vicinity of a target air-fuel ratio.

3 Claims, 8 Drawing Sheets

EXHAUST EMISSION CONTROL DEVICE AND METHOD FOR INTERNAL COMBUSTION ENGINE, AND ENGINE CONTROL UNIT

BACKGROUND OF THE INVENTION

1. Field of the Invention

The present invention relates to an exhaust emission control device and method for an internal combustion engine, and an engine control unit, for purifying exhaust emissions by temporarily trapping NOx contained in exhaust gases emitted from the engine and performing reduction of the trapped NOx.

2. Description of the Related Art

Conventionally, there has been disclosed an exhaust emission control device for an internal combustion engine, e.g. in Japanese Laid-Open Patent Publication (Kokai) No. 2006-207487. This internal combustion engine is a gasoline engine having an exhaust pipe, and a three-way catalyst and a NOx catalyst are arranged in the exhaust pipe in this order from the upstream side to the downstream side, for purifying HC and CO, i.e. reducing HC and CO emissions mainly during low temperature, and for purifying NOx, i.e. reducing NOx emissions, respectively. According to this exhaust emission control device, exhaust gases emitted from the engine during lean burn operation pass through the three-way catalyst and flow into the NOx catalyst to be temporarily trapped therein. Then, when the amount of trapped NOx reaches a predetermined value, rich spike is carried out in which the air-fuel ratio of a mixture supplied to the engine is controlled to a richer side than a stoichiometric air-fuel ratio. The rich spike causes unburned fuel components to be supplied to the NOx catalyst as reducing agent, whereby the NOx trapped in the NOx catalyst is reduced to be purified, i.e. changed into harmless ingredients. Further, the amount of reducing agent supplied to the NOx catalyst is cumulatively calculated from the start of rich spike, and when the cumulative value exceeds a threshold value set according to the amount of trapped NOx, it is judged that the reduction of NOx is complete, and the rich spike is terminated.

As described above, in the conventional exhaust emission control device, the cumulative calculation of the amount of reducing agent supplied to the NOx catalyst is started immediately after the start of rich spike. However, at the initial stage of the rich spike, since the lean burn operation has been carried out up to just before the start of rich spike, and hence a relatively large amount of oxygen remains in the exhaust gases, and a relatively large amount of oxygen has been stored in the three-way catalyst. Therefore, when such exhaust gases pass through the three-way catalyst, the reducing agent is oxidized by the oxygen and is consumed. Accordingly, when the cumulative calculation of the amount of reducing agent supplied to the NOx catalyst is started immediately after the start of rich spike, the calculated cumulative value becomes larger than an actual value. As a result, in a state where the reduction of NOx has not been completed and hence NOx remains in the NOx catalyst, the cumulative value exceeds the threshold valve to terminate the rich spike, which causes insufficient reduction of NOx, resulting in increased exhaust emissions.

SUMMARY OF THE INVENTION

It is an object of the present invention to provide an exhaust emission control device and method for an internal combustion engine, and an engine control unit, which are capable of supplying a just enough amount of reducing agent to the NOx catalyst even when a catalyst is provided on an upstream side of the NOx catalyst, thereby making it possible to reduce exhaust emissions.

To attain the above object, in a first aspect of the present invention, there is provided an exhaust emission control device for an internal combustion engine, for purifying exhaust gases emitted from the engine into an exhaust system, comprising a catalyst that is disposed in the exhaust system, for purifying exhaust gases, a NOx catalyst that is disposed in the exhaust system at a location downstream of the catalyst, for trapping NOx contained in the exhaust gases under an oxidizing atmosphere, and reducing the trapped NOx under a reducing atmosphere to thereby purify the trapped NOx, an air-fuel ratio sensor that is disposed between the catalyst and the NOx catalyst in the exhaust system, for detecting an air-fuel ratio of the exhaust gases, NOx reduction control means for causing the NOx catalyst to carry out an operation for reducing NOx, by supplying a reducing agent to an upstream side of the catalyst to control the exhaust gases flowing into the NOx catalyst such that the exhaust gases form the reducing atmosphere, purified NOx amount parameter-calculating means for calculating a purified NOx amount parameter indicative of an amount of NOx purified in the NOx catalyst, so as to determine a time at which reduction control by the NOx reduction control means should be terminated, and calculation start means for causing calculation of the purified NOx amount parameter to be started by the purified NOx amount parameter-calculating means, when the air-fuel ratio detected by the air-fuel ratio sensor has converged within a vicinity of a predetermined target air-fuel ratio.

With the configuration of this exhaust emission control device, a catalyst and a NOx catalyst are arranged at respective upstream and downstream locations of the exhaust system. NOx contained in exhaust gases emitted from the engine is trapped by the NOx catalyst under an oxidizing atmosphere. Further, the NOx reduction control means causes a reducing agent to be supplied to an upstream side of the catalyst to control the exhaust gases flowing into the NOx catalyst such that the exhaust gases form the reducing atmosphere, whereby the NOx trapped in the NOx catalyst is reduced to be purified, i.e. changed into harmless ingredients. Further, to determine a time at which reduction control should be terminated, a purified NOx amount parameter indicative of an amount of NOx purified in the NOx catalyst is calculated by the purified NOx amount parameter-calculating means. The calculation of the purified NOx amount parameter is started by the calculation start means when the air-fuel ratio detected by the air-fuel ratio sensor disposed between the catalyst and the NOx catalyst has converged within a vicinity of a predetermined target air-fuel ratio.

As described above, when the catalyst is disposed on the upstream side of the NOx catalyst, and the reducing agent is supplied to the upstream side of the catalyst, immediately after the start of reduction control, the supplied reducing agent is consumed by the catalyst before reaching the NOx catalyst and hence is not supplied to the NOx catalyst. Therefore, according to the present invention, the air-fuel ratio sensor disposed between the catalyst and the NOx catalyst detects the air-fuel ratio of the exhaust gases, and when the detected air-fuel ratio has converged within the vicinity of the predetermined target air-fuel ratio, i.e. when the consumption of the reducing agent by the catalyst is substantially terminated and the reducing agent starts to be actually supplied to the NOx catalyst, the calculation of the purified NOx amount parameter is started. This makes it possible to more accurately calculate the amount of NOx purified in the NOx catalyst, and determine the time at which the NOx reduction control should be terminated, based on the calculated purified NOx amount parameter, whereby it is possible supply a just enough amount of reducing agent to the NOx catalyst. As a consequence, it is possible to prevent insufficient reduction of trapped NOx, but properly reduce the NOx to purify the same, i.e. reduce NOx emissions, whereby exhaust emissions can be reduced.

Preferably, the calculation start means causes the calculation of the purified NOx amount parameter to be started by the purified NOx amount parameter-calculating means, upon lapse of a predetermined time period after convergence of the air-fuel ratio detected by the air-fuel ratio sensor within the vicinity of the predetermined target air-fuel ratio.

With this configuration of the preferred embodiment, the calculation of the purified NOx amount parameter is started upon the lapse of a predetermined time period after convergence of the air-fuel ratio detected by the air-fuel ratio sensor within the vicinity of the predetermined target air-fuel ratio. This makes it possible to start calculation of the purified NOx amount parameter after confirming that the reducing agent is being supplied to the NOx catalyst. Therefore, it is possible to supply a more appropriate amount of reducing agent to the NOx catalyst.

To attain the object, in a second aspect of the present invention, there is provided an exhaust emission control method of purifying exhaust gases emitted from an internal combustion engine into an exhaust system thereof, the engine including the exhaust system, a catalyst that is disposed in the exhaust system, for purifying exhaust gases, a NOx catalyst that is disposed in the exhaust system at a location downstream of the catalyst, for trapping NOx contained in the exhaust gases under an oxidizing atmosphere, and reducing the trapped NOx under a reducing atmosphere to thereby purify the trapped NOx, and an air-fuel ratio sensor that is disposed between the catalyst and the NOx catalyst of the exhaust system, for detecting an air-fuel ratio of the exhaust gases, the exhaust emission control method comprising a NOx reduction control step of causing the NOx catalyst to carry out an operation for reducing NOx, by supplying a reducing agent to an upstream side of the catalyst to control the exhaust gases flowing into the NOx catalyst such that the exhaust gases form the reducing atmosphere, a purified NOx amount parameter-calculating step of calculating a purified NOx amount parameter indicative of an amount of NOx purified in the NOx catalyst, so as to determine a time at which reduction control in the NOx reduction control step should be terminated, and a calculation start step of causing calculation of the purified NOx amount parameter to be started in the purified NOx amount parameter-calculating step, when the air-fuel ratio detected by the air-fuel ratio sensor has converged within a vicinity of a predetermined target air-fuel ratio.

With the configuration of the second aspect of the present invention, it is possible to obtain the same advantageous effects as provided by the first aspect of the present invention.

Preferably, the calculation start step includes causing the calculation of the purified NOx amount parameter to be started in the purified NOx amount parameter-calculating step, upon lapse of a predetermined time period after convergence of the air-fuel ratio detected by the air-fuel ratio sensor within the vicinity of the predetermined target air-fuel ratio.

With the configuration of the preferred embodiment, it is possible to obtain the same advantageous effects as provided by the preferred embodiment of the first aspect of the present invention.

To attain the object, in a third aspect of the present invention, there is provided an engine control unit including a control program for causing a computer to execute an exhaust emission control method of purifying exhaust gases emitted from an internal combustion engine into an exhaust system thereof, the engine including the exhaust system, a catalyst that is disposed in the exhaust system, for purifying exhaust gases, a NOx catalyst that is disposed in the exhaust system at a location downstream of the catalyst, for trapping NOx contained in the exhaust gases under an oxidizing atmosphere, and reducing the trapped NOx under a reducing atmosphere to thereby purify the trapped NOx, and an air-fuel ratio sensor that is disposed between the catalyst and the NOx catalyst of the exhaust system, for detecting an air-fuel ratio of the exhaust gases, wherein the control program causes the computer to cause the NOx catalyst to carry out an operation for reducing NOx, by supplying a reducing agent to an upstream side of the catalyst to control the exhaust gases flowing into the NOx catalyst such that the exhaust gases form the reducing atmosphere, calculate a purified NOx amount parameter indicative of an amount of NOx purified in the NOx catalyst, so as to determine a time at which reduction control should be terminated, and cause calculation of the purified NOx amount parameter to be started, when the air-fuel ratio detected by the air-fuel ratio sensor has converged within a vicinity of a predetermined target air-fuel ratio.

With the configuration of the third aspect of the present invention, it is possible to obtain the same advantageous effects as provided by the first aspect of the present invention.

Preferably, the control program causes the calculation of the purified NOx amount parameter to be started, upon lapse of a predetermined time period after convergence of the air-fuel ratio detected by the air-fuel ratio sensor within the vicinity of the predetermined target air-fuel ratio.

With the configuration of the preferred embodiment, it is possible to obtain the same advantageous effects as provided by the preferred embodiment of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
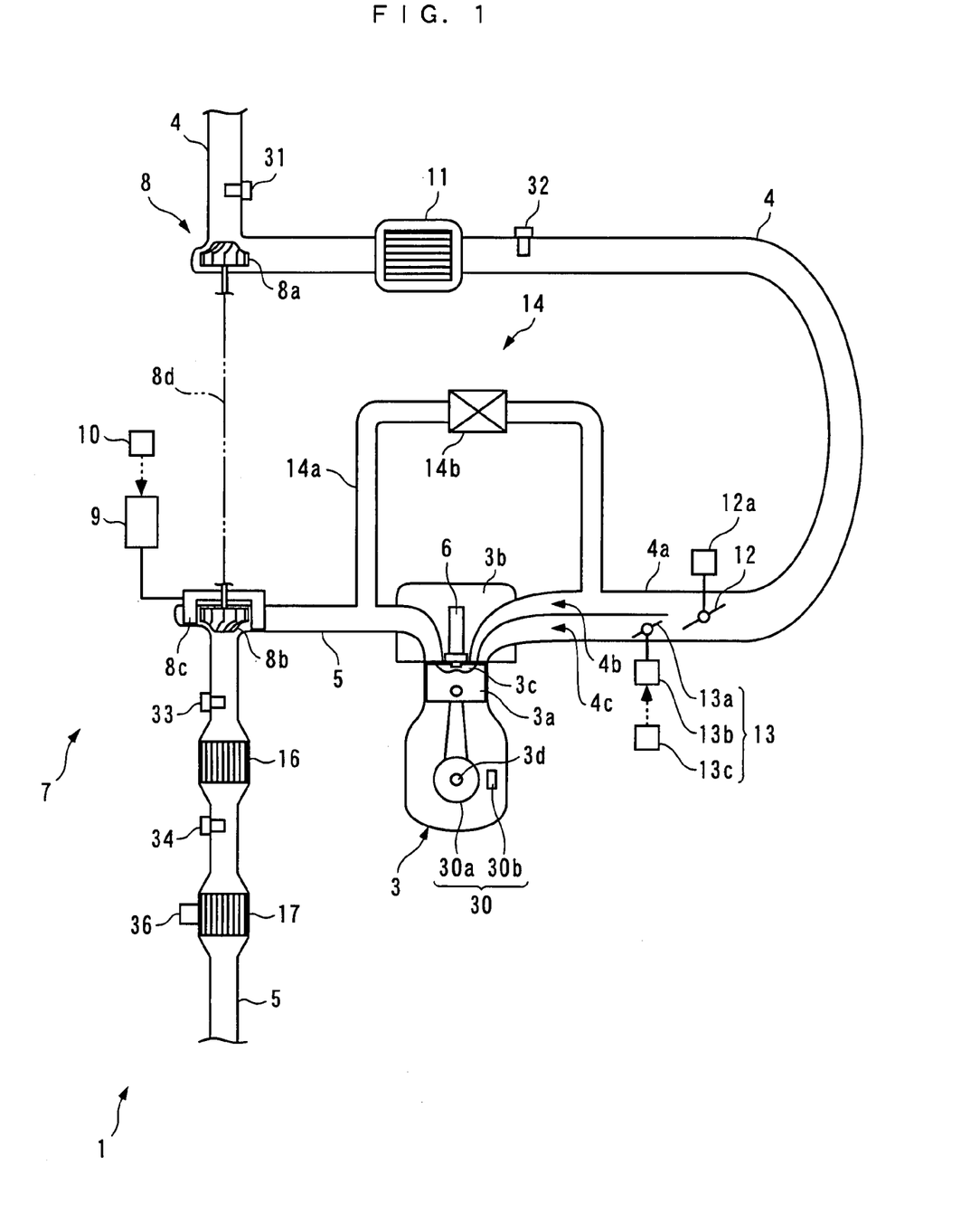
FIG. 1 is a schematic diagram of an internal combustion engine to which is applied an exhaust emission control device according to the present invention.

Hereafter, an exhaust emission control device according to an embodiment of the present invention will be described with reference to the drawings. FIG. 1 is a diagram showing the exhaust emission control device 1 to which is applied the present invention, and an internal combustion engine 3. The engine (hereinafter simply referred to as "the engine") 3 is a diesel engine that has e.g. four cylinders (only one of which is shown), and is installed on a vehicle.

A combustion chamber 3c is defined between a piston 3a and a cylinder head 3b for each cylinder of the engine 3. The cylinder head 3b has an intake pipe 4 and an exhaust pipe 5 connected thereto, with a fuel injection valve (hereinafter referred to as "the injector") 6 mounted therethrough such that it faces the combustion chamber 3c.

The injector 6 is inserted into the combustion chamber 3c through a central portion of the top wall thereof, and is connected to a high-pressure pump and a fuel tank, neither of which is shown, in the mentioned order via a common rail. A fuel injection amount TOUT of fuel injected from the injector 6 is controlled by controlling the valve-opening time period thereof by a drive signal from the ECU 2 (see FIG. 2).

A magnet rotor 30a is mounted on a crankshaft 3d of the engine 3. The magnet rotor 30a and an MRE pickup 30b form a crank angle sensor 30 which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the intake stroke thereof, and in the case of the four-cylinder engine of the illustrated example, it is delivered whenever the crankshaft 3d rotates through 180 degrees.

The intake pipe 4 has a supercharging device 7 disposed therein. The supercharging device 7 is comprised of a supercharger 8 formed by a turbo charger, an actuator 9 connected to the supercharger 8, and a vane opening control valve 10.

The supercharger 8 includes a compressor blade 8a rotatably mounted in the intake pipe 4, a rotatable turbine blade 8b and a plurality of rotatable variable vanes 8c (only two of which are shown) provided in the exhaust pipe 5, and a shaft 8d integrally formed with the two blades 8a and 8b such that the shaft 8d connects them. In the supercharger 8, as the turbine blade 8b is driven for rotation by exhaust gases flowing through the exhaust pipe 5, the compressor blade 8a integrally formed with the shaft 8d which connects between the compressor blade 8a and the turbine blade 8b is also rotated, whereby the supercharger 8 is caused to perform a supercharging operation for pressurizing intake air in the intake pipe 4.

The actuator 9 is of a diaphragm type which is operated by negative pressure, and is mechanically connected to the variable vanes 8c. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of each variable vane 8c. Thus, boost pressure is controlled.

An intercooler 11 of a water cooling type, and a throttle valve 12 (NOx reduction control means) are inserted into the intake pipe 4 at respective locations downstream of the supercharger 8 from upstream to downstream in the mentioned order. The intercooler 11 is provided for cooling intake air e.g. when the temperature of the intake air is raised by the supercharging operation of the supercharging device 7. An actuator 12a comprised e.g. of a DC motor is connected to the throttle valve 12. The opening TH of the throttle valve 12 (hereinafter referred to as "the throttle valve opening TH") is controlled by controlling the duty factor of electric current supplied to the actuator 12a by the ECU 2.

Further, the intake pipe 4 has an air flow sensor 31 inserted therein at a location upstream of the supercharger 8, and a boost pressure sensor 32 inserted therein between the intercooler 11 and the throttle valve 12. The air flow sensor 31 detects an intake air amount QA, to deliver a signal indicative of the sensed intake air amount QA to the ECU 2, while the boost pressure sensor 32 detects boost pressure PACT in the intake pipe 4, to deliver a signal indicative of the sensed boost pressure PACT to the ECU 2.

Furthermore, the intake pipe 4 has an intake manifold 4a divided into a swirl passage 4b and a bypass passage 4c between the collecting section of the intake manifold 4a and each branch portion thereof. The passages 4b and 4c communicate with the combustion chamber 3c via each intake port.

The bypass passage 4c is provided with a swirl device 13 for generating a swirl in the combustion chamber 3c. The swirl device 13 is comprised of a swirl valve 13a, an actuator 13b for actuating the swirl valve 13a to open and close the same, and a swirl control valve 13c. The actuator 13b and the swirl control valve 13c are configured similarly to the actuator 9 and the vane opening control valve 10 of the supercharging device 7, respectively. The swirl control valve 13c is connected to the above-described negative pressure pump. With this arrangement, the degree of opening of the swirl control valve 13c is controlled by a drive signal from the ECU 2, whereby negative pressure supplied to the actuator 13b is changed to change the degree of opening of the swirl valve 13a, whereby the strength of the swirl is controlled.

Further, the engine 3 is provided with an EGR device 14 that has an EGR pipe 14a and an EGR control valve 14b. The EGR pipe 14a connects between the intake pipe 4 and the exhaust pipe 5, more specifically, between the swirl passage 4b in the collecting section of the intake manifold 4a and a portion of the exhaust pipe 5 at a location upstream of the supercharger 8. Part of exhaust gases exhausted from the engine 3 is recirculated into the intake pipe 4 via the EGR pipe 14a as EGR gases, whereby combustion temperature in the combustion chamber 3c is lowered to decrease NOx contained in the exhaust gases.

The EGR control valve 14b is implemented by a linear solenoid valve inserted into the EGR pipe 14a, and the valve lift amount VLACT thereof is linearly controlled by a drive signal under duty ratio control from the ECU 2, whereby the amount of EGR gases is controlled.

A three-way catalyst 16 (catalyst) and a NOx catalyst 17 are provided in the exhaust pipe 5 at respective locations downstream of the supercharger 8 from upstream to downstream in the mentioned order. The three-way catalyst 16 performs oxidization of HC and CO and reduction of NOx in exhaust gases under a stoichiometric atmosphere, to thereby purify i.e. reduce exhaust emissions. The NOx catalyst 17 traps (absorbs) NOx contained in exhaust gases under an oxidizing atmosphere in which the concentration of oxygen in exhaust gases is high, and performs reduction of the trapped NOx under a reducing atmosphere in which a large amount of reducing agent is contained in exhaust gases, to thereby purify exhaust emissions. The NOx catalyst 17 is provided with a NOx catalyst temperature sensor 36 that detects the temperature TLNC of the NOx catalyst 17 (hereinafter referred to as "the NOx catalyst temperature TLNC") to deliver a signal indicative of the detected NOx catalyst temperature TLNC to the ECU 2.

Furthermore, a first LAF sensor 33 and a second LAF sensor 34 are inserted into the exhaust pipe 5 at respective locations upstream of and downstream of the three-way catalyst 16. The first LAF sensor 33 and the second LAF sensor 34 linearly detect the concentrations VLAF1 and VLAF2 of oxygen in exhaust gases, respectively. The ECU 2 calculates first and second actual air-fuel ratios AF1ACT and AF2ACT indicative of respective air-fuel ratios corresponding to the detected oxygen concentrations VLAF1 and VLAF2, respectively. Further, an accelerator pedal opening sensor 35 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

Figure 2:
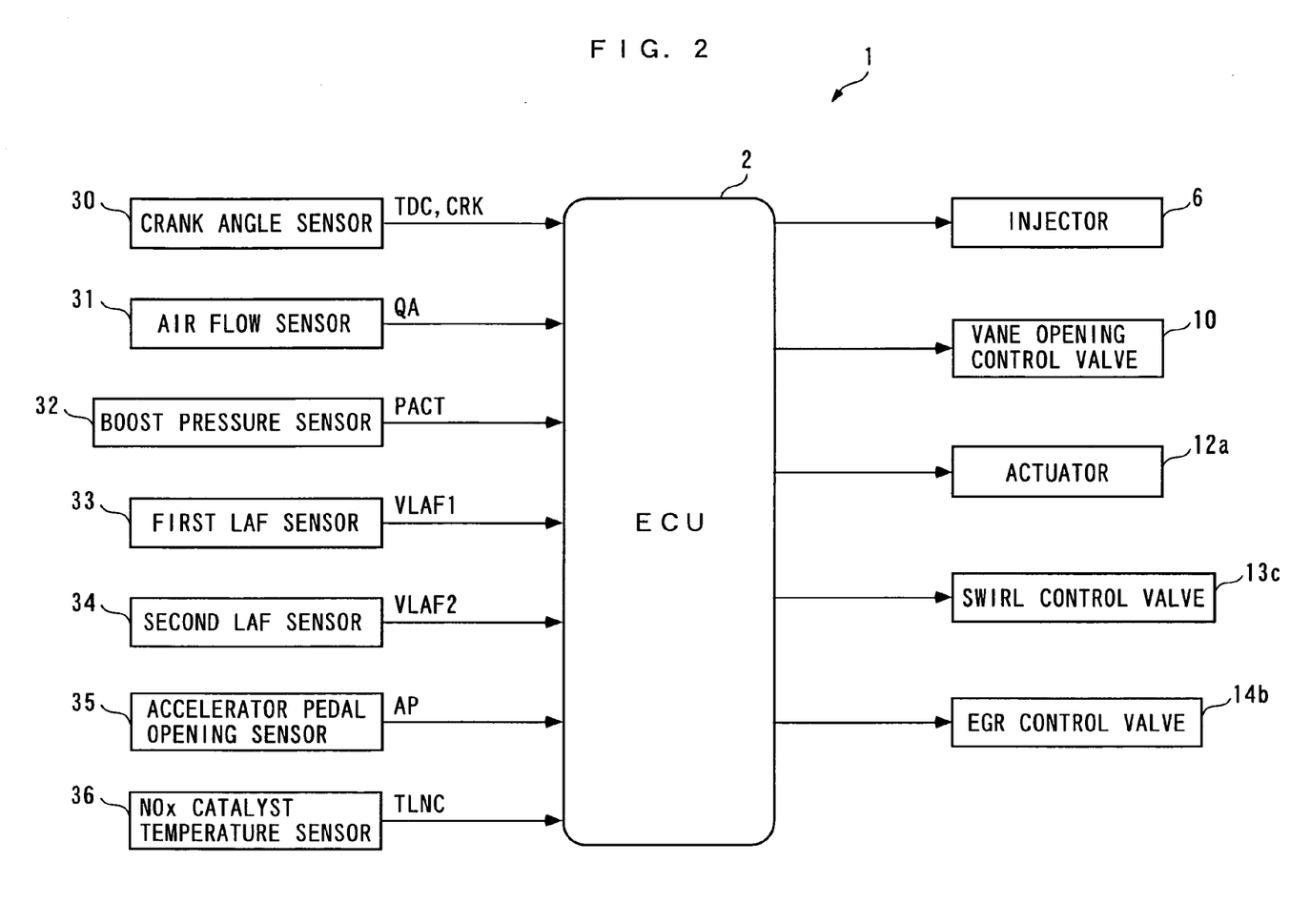
FIG. 2 is a diagram showing part of the exhaust emission control device.

In the present embodiment, the ECU 2 forms NOx reduction control means, purified NOx amount parameter-calculating means, and calculation start means, and is implemented by a microcomputer comprised of an I/O interface, a CPU, a RAM, and a ROM. The detection signals from the aforementioned sensors 30 to 36 are input to the CPU after the I/O interface performs A/D conversion and waveform shaping thereon.

In response to these input signals, the CPU determines an operating condition of the engine 3, and based on the determined operating condition of the engine, performs engine control, such as fuel injection amount control and intake air amount control, in accordance with control programs read from the ROM. Further, the CPU determines whether or not rich spike should be executed as reduction control for performing reduction of NOx trapped in the NOx catalyst 17, and performs the rich spike according to the result of the determination. It should be noted as described hereinafter, the rich spike is performed by increasing the fuel injection amount TOUT and decreasing the intake air amount QA, thereby enriching the air-fuel ratio of a mixture supplied to the combustion chamber 3c, to supply unburned components of fuel to the NOx catalyst 17 as reducing agent.

Figure 3:
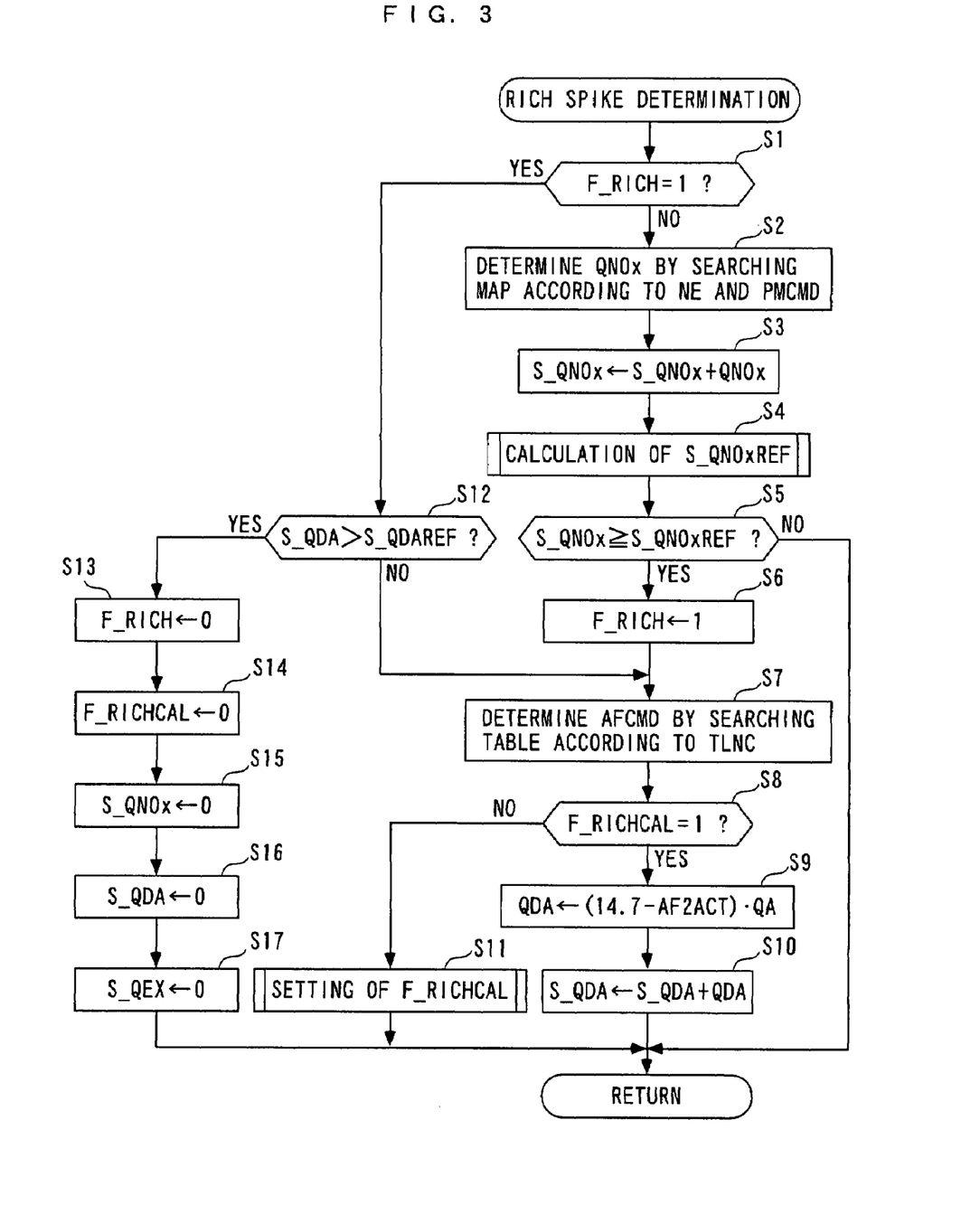
FIG. 3 is a flowchart showing a process for determining execution of rich spike.

FIG. 3 shows a process for determining the execution of the rich spike. The process is executed whenever a predetermined time period elapses. First, in a step 1 (shown as S1 in abbreviated form in FIG. 3; the following steps are also shown in abbreviated form), it is determined whether or not a rich spike flag F_RICH is equal to 1. As described hereinafter, the rich spike flag F_RICH is set to 1 if conditions for executing the rich spike are satisfied.

If the answer to the question of the step 1 is negative (NO), i.e. if the rich spike is not being executed, the process proceeds to a step 2, wherein a trapped NOx amount QNOx is determined by searching a map (not shown) according to the engine speed NE and demanded torque PMCMD. The trapped NOx amount QNOx represents an amount of NOx contained in exhaust gases emitted from the combustion chamber 3c during the present cycle, and hence represents an amount of NOx trapped in the NOx catalyst 17. It should be noted that the demanded torque PMCMD can be determined by searching a map (not shown) according to the engine speed NE and the accelerator pedal opening AP.

Next, in a step 3, an cumulative value S_QNOx of an amount of NOx trapped thus far is calculated by adding the trapped NOx amount QNOx to the immediately preceding value of the cumulative value S_QNOx. That is, the cumulative value S_QNOx of the trapped NOx amount corresponds to an amount of NOx trapped in the NOx catalyst 17.

Then, in a step 4, a trapped NOx amount reference value S_QNOxREF is calculated. Detailed description thereof will be given hereinafter.

Next, in a step 5, it is determined whether or not the cumulative value S_QNOx of the trapped NOx amount is not smaller than the trapped NOx amount reference value S_QNOxREF. If the answer to this question is negative (NO), it is judged that since the amount of NOx trapped in the NOx catalyst 17 is still small, the rich spike should not be executed, and the present process is immediately terminated. On the other hand, if the answer to the question of the step 5 is affirmative (YES), i.e. if S_QNOx≧S_QNOxREF holds, it is judged that the rich spike should be executed, so that the rich spike flag F_RICH is set to 1 (step 6), followed by starting the rich spike.

Figure 7:
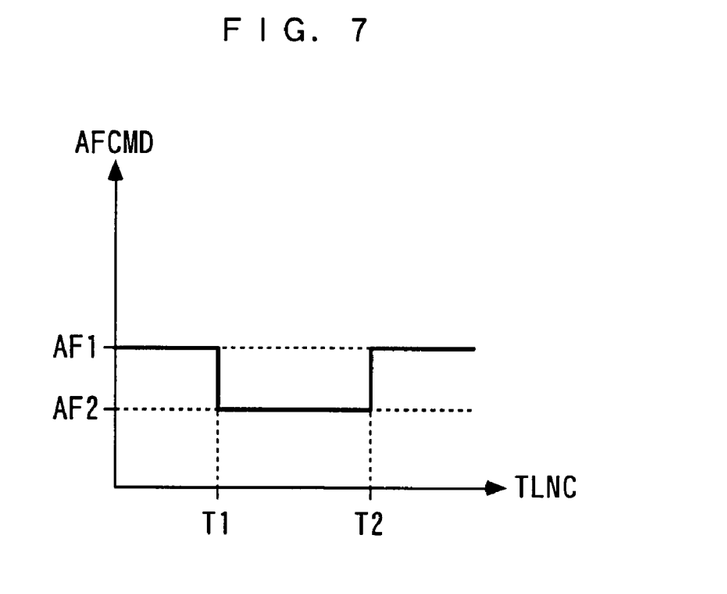
FIG. 7 is a diagram showing an example of an AFCMD table for use in the FIG. 3 process.

After that, in a step 7, a target air-fuel ratio AFCMD is determined by searching an AFCMD table according to the temperature TLNC of the NOx catalyst (NOx catalyst temperature TLNC). As shown in FIG. 7, in the AFCMD table, when the NOx catalyst temperature TLNC is not higher than a first predetermined temperature T1 (e.g. 200° C.), and when the NOx catalyst temperature TLNC is not lower than a second predetermined temperature T2 (e.g. 400° C.) higher than the first predetermined temperature T1, the target air-fuel ratio AFCMD is set to a slightly rich first air-fuel ratio AF1 (e.g. 14.3) which is slightly lower than 14.7 corresponding to the stoichiometric air-fuel ratio. This is to perform reduction control mainly by the three-way catalyst 16 since it is estimated that the NOx catalyst 17 is not active enough when the temperature TLNC is within the above-described ranges. On the other hand, when the NOx catalyst temperature TLNC is between the first predetermined temperature T1 and the second predetermined temperature T2, it is presumed that the NOx catalyst 17 is active enough, and hence to perform reduction control by the NOx catalyst 17, the target air-fuel ratio AFCMD is set to a richer second air-fuel ratio AF2 (e.g. 14.0) richer than the first air-fuel ratio AF1.

Then, in a step 8, it is determined that a reducing agent calculation flag F_RICHCAL is equal to 1. The reducing agent calculation flag F_RICHCAL is set to 1, as described hereinafter, when conditions for calculating the amount of reducing agent supplied to the NOx catalyst 17 are satisfied. If the answer to this question if negative (NO), i.e. if the conditions for calculating the amount of reducing agent have not been satisfied yet, the process proceeds to a step 11, wherein a reducing agent calculation flag F_RICHCAL-setting process is executed, followed by terminating the present process.

Figure 5:
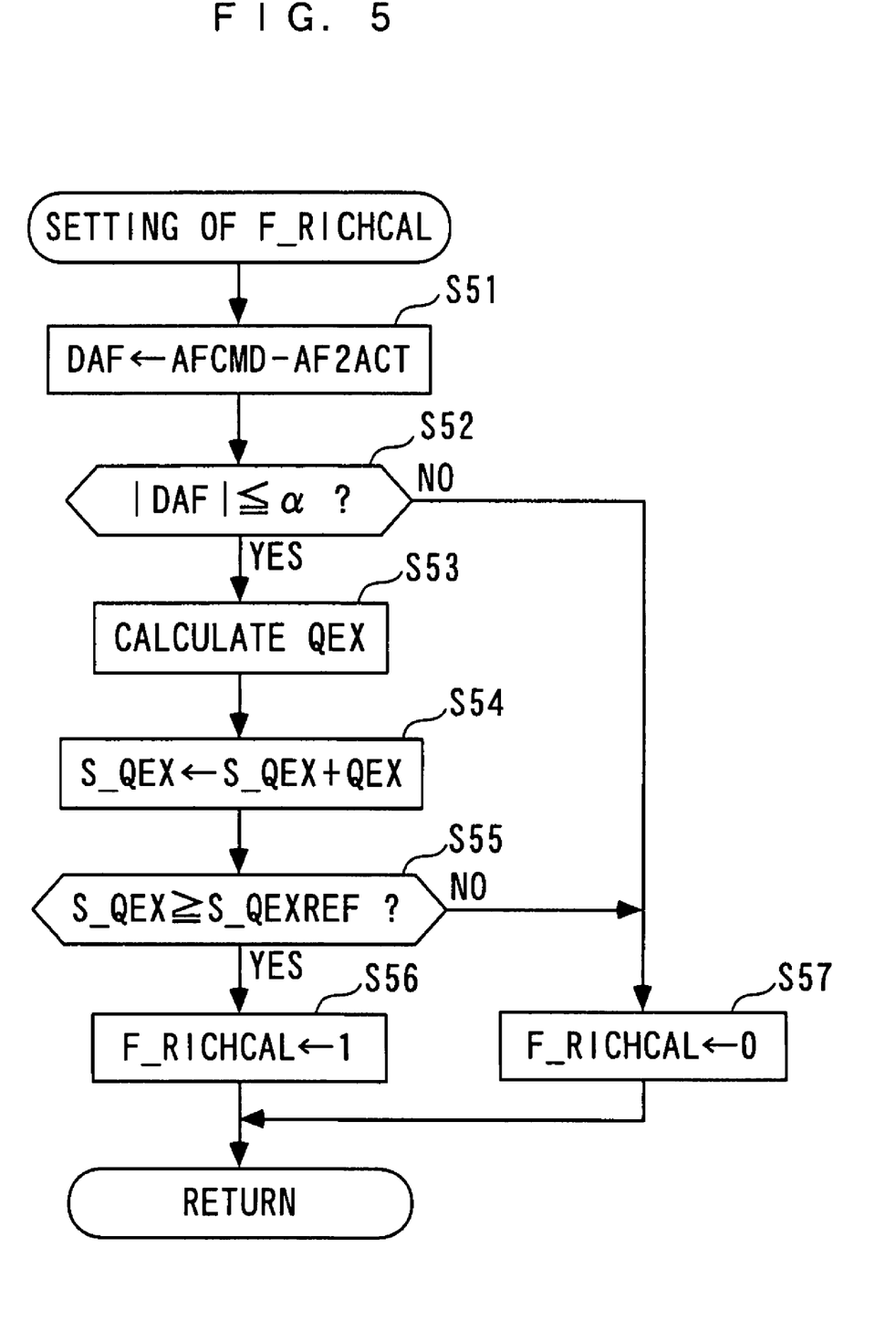
FIG. 5 is a flowchart showing an F_RICHCAL-setting process.

FIG. 5 shows the reducing agent calculation flag F_RICHCAL-setting process. In this process, first, in a step 51, an air-fuel ratio difference DAF is calculated by subtracting the second actual air-fuel ratio AF2ACT detected by the second LAF sensor 34 from the target air-fuel ratio AFCMD.

Next, it is determined whether or not the absolute value of the calculated air-fuel ratio difference DAF is not higher than a predetermined value a ((e.g. 0.5) in a step 52. If the answer to this question is negative (NO), i.e. if DAF>α or DAF<−α holds, the reducing agent calculation flag F_RICHCAL is set to 0 (step 57), followed by terminating the present process.

On the other hand, if the answer to the question of the step 52 is affirmative (YES), i.e. if $-\alpha \leqq DAF \leqq \alpha$ holds, it is judged that the second actual air-fuel ratio AF2ACT has converged within a predetermined range in the vicinity of a rich target air-fuel ratio AFCMD not higher than the stoichiometric air-fuel ratio, and hence the consumption of reducing agent in the three-way catalyst is terminated to cause the reducing agent to start to be actually supplied to the NOx catalyst 17, so that the process proceeds to a step 53, wherein an exhaust gas flow amount QEX is calculated. The exhaust gas flow amount QEX is determined by searching a map (not shown) according to the engine speed NE and the intake air amount QA.

Then, in a step 54, the present cumulative value S_QEX of the exhaust gas flow amount is calculated by adding the calculated exhaust gas flow amount QEX to the immediately preceding value of the cumulative value S_QEX. As is apparent from the above calculation method, the cumulative value S_QEX of the exhaust gas flow amount corresponds to a total amount of exhaust gases flowed into the NOx catalyst 17 after the answer to the question of the step 52 becomes affirmative (YES) indicating that the second actual air-fuel ration AF2ACT has converged within the predetermined range.

Next, in a step 55, it is determined whether or not the calculated cumulative value S_QEX of the exhaust gas flow amount is not smaller than a predetermined exhaust gas flow amount reference value S_QEXREF. If the answer to this question is negative (NO), the process proceeds to the step 57, followed by termination thereof. On the other hand, if the answer to this question is affirmative (YES), it is judged that the reducing agent is being supplied to the NOx catalyst 17 after the second actual air-fuel ratio AF2ACT has converged, and the conditions for starting the calculation of the amount of reducing agent supplied to the NOx catalyst 17 are satisfied, so that the reducing agent calculation flag F_RICHCAL is set to 1 (step 56), followed by terminating the present process.

Referring again to FIG. 3, if the reducing agent calculation flag F_RICH is set to 1 as described above, the answer to the question of the step 8 becomes affirmative, so that the process proceeds to a step 9, wherein a reducing agent amount QDA is calculated. The reducing agent amount QDA is determined by multiplying a value obtained by subtracting the second actual air-fuel ratio AF2ACT from 14.7 representative of a stoichiometric air-fuel ratio, by the intake air amount QA corresponding to the flow rate of exhaust gases. It should be noted that the space velocity SV of exhaust gases may be used in place of the intake air amount QA.

Then, in a step 10, the reducing agent amount QDA calculated in the step 7 is added to the cumulative value S_QDA of the reducing agent amount, calculated thus far, whereby the current cumulative value S_QDA of the reducing agent amount is calculated. This cumulative value S_QDA corresponds to the total amount of reducing agent actually supplied to the NOx catalyst 17 by execution of rich spike, and hence corresponds to the amount of NOx reduced in the NOx catalyst 17.

On the other hand, if the answer to the question of the step 1 is affirmative (YES), i.e. if the rich spike is being executed, it is determined whether or not the cumulative value S_QDA of the reducing agent amount is larger than a reducing agent amount reference value S_QDAREF (step 12). The reducing agent amount reference value S_QDAREF corresponds to the amount of reducing agent required for reduction of the NOx trapped in the NOx catalyst 17, and is set based on the trapped NOx amount reference value S_QNOxREF calculated in the step 4.

If the answer to this question is negative (NO), i.e. if S_QDA≦S_QDAREF holds, it is judged that the required amount of reducing agent is not supplied to the NOx catalyst 17 yet, and the reduction of NOx has not been completed, so that the step 7 et seq. are executed to continue the rich spike and calculate the cumulative value S_QDA of the reducing agent amount, followed by terminating the present process.

On the other hand, if the answer to this question of the step 12 is affirmative (YES), i.e. if S_QDA>S_QDAREF holds, it is judged that the required amount of reducing agent is supplied to the NOx catalyst 17, and the reduction of NOx has been completed, so that the rich spike flag F_RICH is set to 0 (step 13), to terminate the rich spike. Then, the reducing agent calculation flag F_RICHCAL is reset to 0 (step 14), and the cumulative value S_QNOx of the trapped NOx amount, the cumulative value S_QDA of the reducing agent amount, and the cumulative value S_QEX of the exhaust gas flow amount are reset to 0 (steps 15 to 17), followed by terminating the present process.

As described above, in the present process, when the air-fuel ratio difference DAF between the second actual air-fuel ratio AF2ACT detected by the second LAF sensor 34 and the rich target air-fuel ratio AFCMD lower than the stoichiometric air-fuel ratio has converged within the predetermined range, and the reducing agent starts to be actually supplied to the NOx catalyst 17, the calculation of the cumulative value S_QDA of the reducing agent amount is started. This makes it possible to more accurately calculate the amount of reducing agent actually supplied to the NOx catalyst 17, and supply a just enough amount of reducing agent to the NOx catalyst 17 according to the trapped NOx amount after the cumulative value S_QDA exceeds the reducing agent amount reference value S_QDAREF. As a consequence, it is possible to prevent insufficient reduction of trapped NOx, but properly reduce NOx to purify the same, i.e. reduce NOx emissions, whereby exhaust emissions can be reduced.

Further, the calculation of the amount of reducing agent supplied to the NOx catalyst is started when the cumulative value S_QEX of the exhaust gas flow amount becomes equal to or larger than the exhaust gas flow amount reference value S_QEXREF after the second actual air-fuel ratio AF2ACT converged. Therefore, it is possible to start calculation of the cumulative value S_QEX of the reducing agent amount after confirming that the reducing agent is being supplied to the NOx catalyst 17. This makes it possible to supply a more appropriate amount of reducing agent to the NOx catalyst 17 according to the trapped NOx amount.

Further, even if the amount of reducing agent to be consumed in the three-way catalyst 16 immediately after the start of rich spike lowers due to aging of the three-way catalyst 16, the time period over which the second actual air-fuel ratio AF2ACT converges within the range in the vicinity of the target air-fuel ratio AFCMD is reduced according to the lowering of the amount of the consumption. This makes it possible to start the calculation of the reducing agent amount in appropriate timing irrespective of the aging of the three-way catalyst 16.

Figure 4:
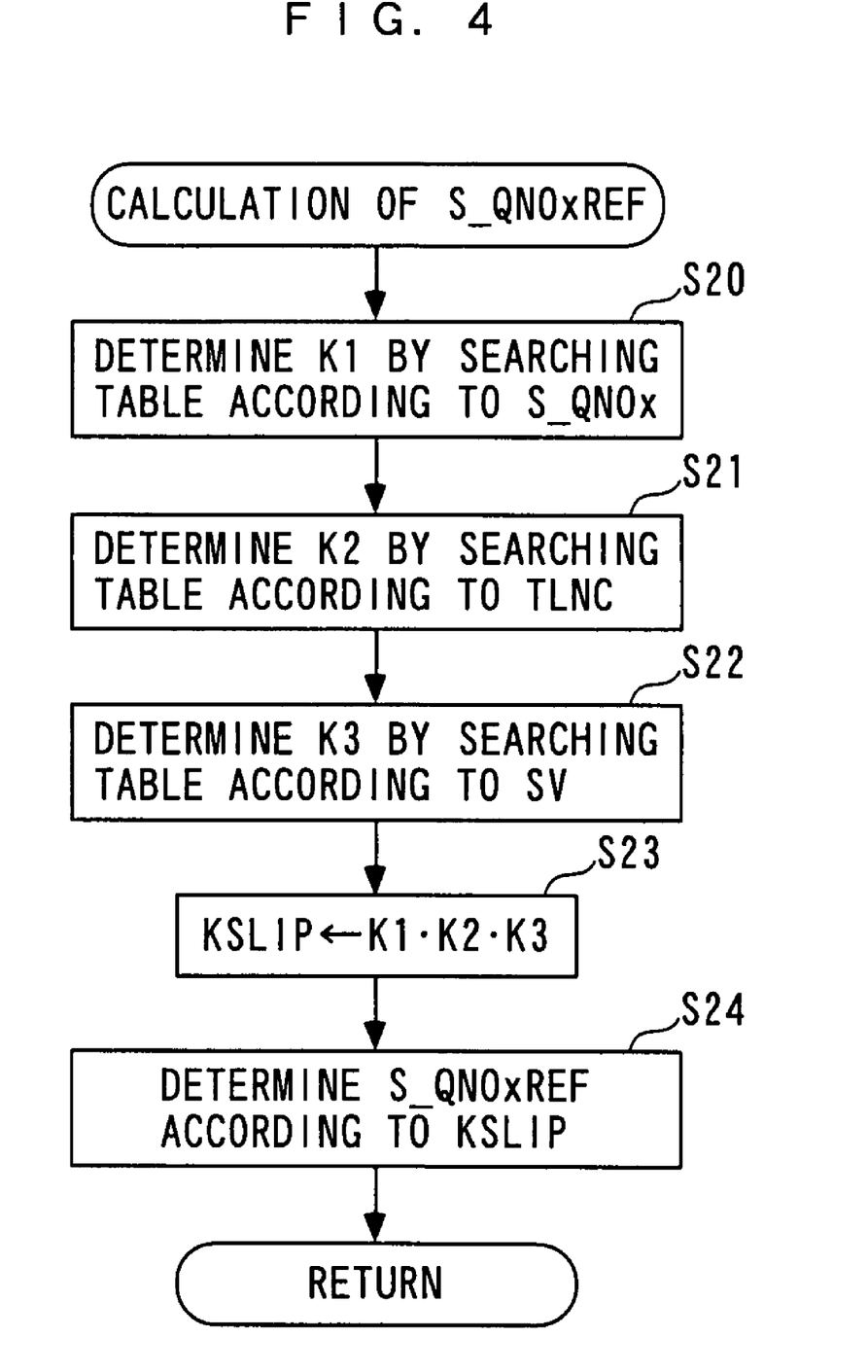
FIG. 4 is a flowchart showing a process for calculating S_QNOxREF.

FIG. 4 shows a process for calculating the trapped NOx amount reference value S_QNOxREF, executed in the step 4 in FIG. 3. In this process, the trapped NOx amount reference value S_QNOxREF is calculated by taking into account parameters influencing NOx slip (phenomenon in which during reduction control of NOx, part of NOx trapped by a NOx catalyst desorbs from the NOx catalyst without being reduced) and characteristics of the NOx slip.

First, in a step 20, a first coefficient K1 is determined by searching a K1 table, not shown, according to the cumulative value S_QNOx of the trapped NOx amount. In this K1 table, the first coefficient K1 is set to a larger value as the cumulative value S_QNOx is larger, based on a characteristic of the amount of NOx slip dependent on the cumulative value S_QNOx.

Then, in a step 21, a second coefficient K2 is determined by searching a K2 table, not shown, according to the NOx catalyst temperature TLNC. In this K2 table, the second coefficient K2 is set to a smaller value as the NOx catalyst temperature TLNC is higher, based on a characteristic of the amount of NOx slip dependent on the NOx catalyst temperature TLNC.

Next, in a step 22, a third coefficient K3 is determined by searching a K3 table, not shown, according to the space velocity SV of exhaust gases. In this K3 table, the third coefficient K3 is set to a larger value as the space velocity SV is higher, based on a characteristic of the amount of NOx slip dependent on the space velocity SV.

Then, in a step 23, a slip coefficient KSLIP is calculated by multiplying the first to third coefficients K1 to K3 calculated in the steps 20 to 22, by each other. In a step 24 following the step 23, the trapped NOx amount reference value S_QNOxREF is determined by searching an S_QNOxREF table shown in FIG. 6 according to the slip coefficient KSLIP, followed by terminating the present process.

Figure 6:
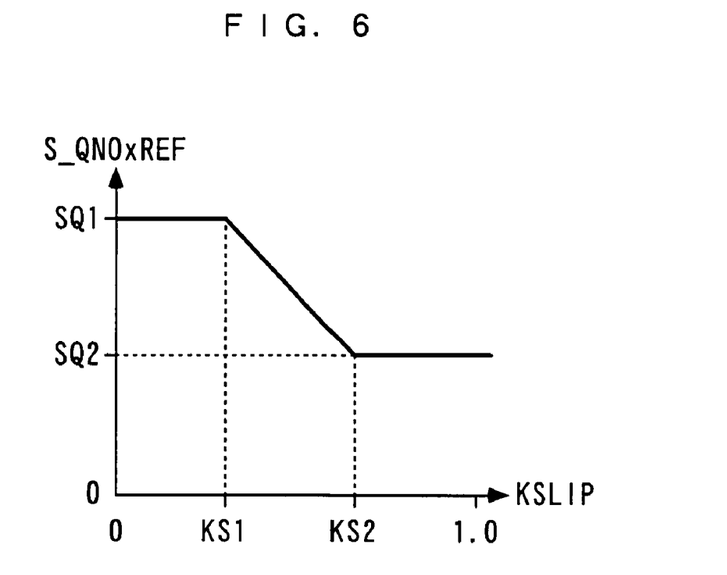
FIG. 6 is a diagram showing an example of an S_QNOxREF table for use in the FIG. 4 process.

In the above S_QNOxREF table, the trapped NOx amount reference value S_QNOxREF is set to a first reference value SQ1 when the slip coefficient KSLIP is not larger than a first predetermined value KS1, whereas when the slip coefficient KSLIP is not smaller than a second predetermined value KS2, it is set to a second reference value SQ2 smaller than the first reference value SQ1. Further, when the slip coefficient KSLIP is between the first and second predetermined values KS1 and KS2, the trapped NOx amount reference value S_QNOxREF is set such that it linearly changes between the first and second reference values SQ1 and SQ2.

As described above, the trapped NOx amount reference value S_QNOxREF is basically set to a smaller value as the slip coefficient KSLIP is larger, i.e. as the estimated amount of NOx slip is larger. Then, the trapped NOx amount reference value S_QNOxREF set as above is compared with the cumulative value S_QNOx of the trapped NOx amount in the step 5 appearing in FIG. 3. As a consequence, the timing for execution of the rich spike is advanced as the predicted amount of NOx slip is larger.

Figure 8:
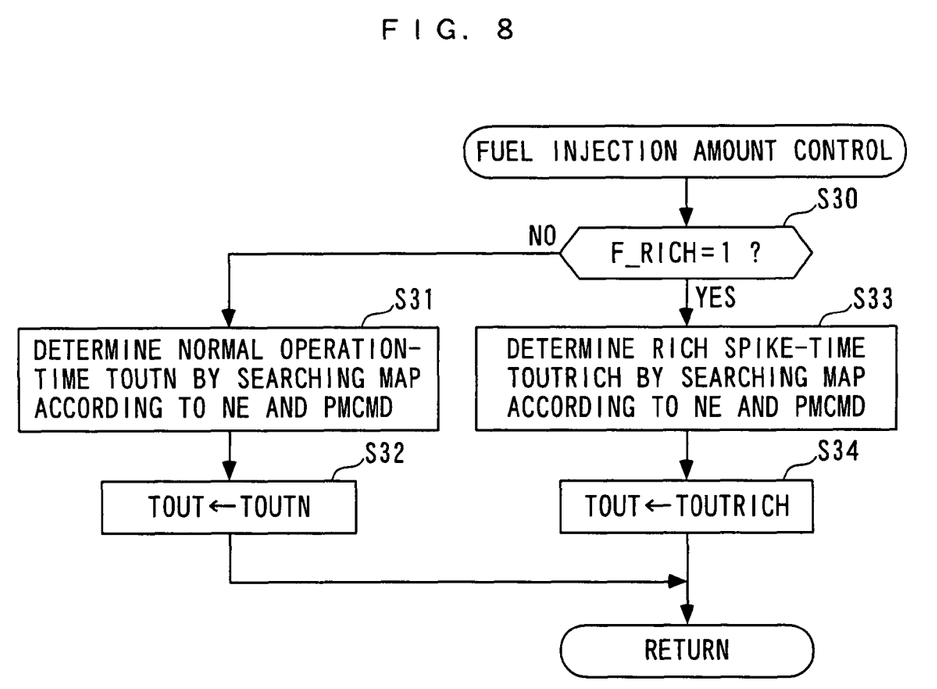
FIG. 8 is a flowchart showing a control process for controlling a fuel injection amount.

FIG. 8 shows a control process for controlling the fuel injection amount. In this process, the fuel injection amount of the injector 6 is controlled according to whether or not the conditions for executing the rich spike are satisfied, which is determined in the FIG. 3 process. First, in a step 30, it is determined whether or not the rich spike flag F_RICH is equal to 1.

If the answer to this question is negative (NO), i.e. if the conditions for executing the rich spike are not satisfied, a normal operation-time fuel injection amount TOUTN is determined by searching a map, not shown, according to the engine speed NE and the demanded torque PMCMD (step 31), and the calculated normal operation-time fuel injection amount TOUTN is set as the fuel injection amount TOUT (step 32), followed by terminating the present process.

On the other hand, if the answer to the question of the step 30 is affirmative (YES), i.e. if the conditions for executing the rich spike are satisfied, a rich spike-time fuel injection amount TOUTRICH is determined by searching a map, not shown, according to the engine speed NE and the demanded torque PMCMD (step 33). The rich spike-time fuel injection amount TOUTRICH is set to a larger value than the value of the normal operation-time fuel injection amount TOUTN.

Then, in a step 34, the rich spike-time fuel injection amount TOUTRICH calculated in the step 33 is set as the fuel injection amount TOUT, followed by terminating the present process.

Figure 9:
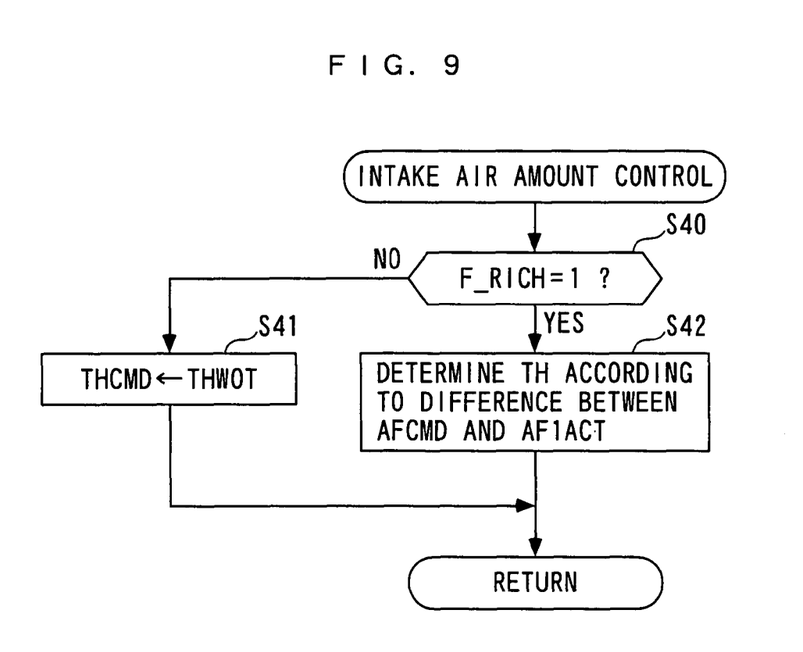
FIG. 9 is a flowchart showing a control process for controlling an intake air amount.

FIG. 9 shows a control process for controlling the intake air amount. In this process, the throttle valve opening TH is controlled according to whether or not the conditions for executing the rich spike are satisfied, whereby the intake air amount QA is controlled. First, in a step 40, it is determined whether or not the rich spike flag F_RICH is equal to 1.

If the answer to this question is negative (NO), i.e. if the conditions for executing the rich spike are not satisfied, a target throttle valve opening THCMD is set to a full opening THWOT (step 41), followed by terminating the present process.

On the other hand, if the answer to the question of the step 40 is affirmative (YES), i.e. if the conditions for executing the rich spike are satisfied, a rich spike-time throttle valve opening TH is determined based on the difference between the target air-fuel ratio AFCMD calculated in the step 7 in FIG. 3 and the first actual air-fuel ratio AF1ACT (step 42), followed by terminating the present process.

As described above, the rich spike is performed by making the fuel injection amount TOUT larger and the intake air amount QA smaller through control of the throttle valve 12, than during normal operation of the engine 3. It should be noted that the intake air amount QA may be controlled by controlling the supercharging device 7, the swirl device 13, or the EGR device 14 in place of or in combination of control of the throttle valve 12.

Figure 10:
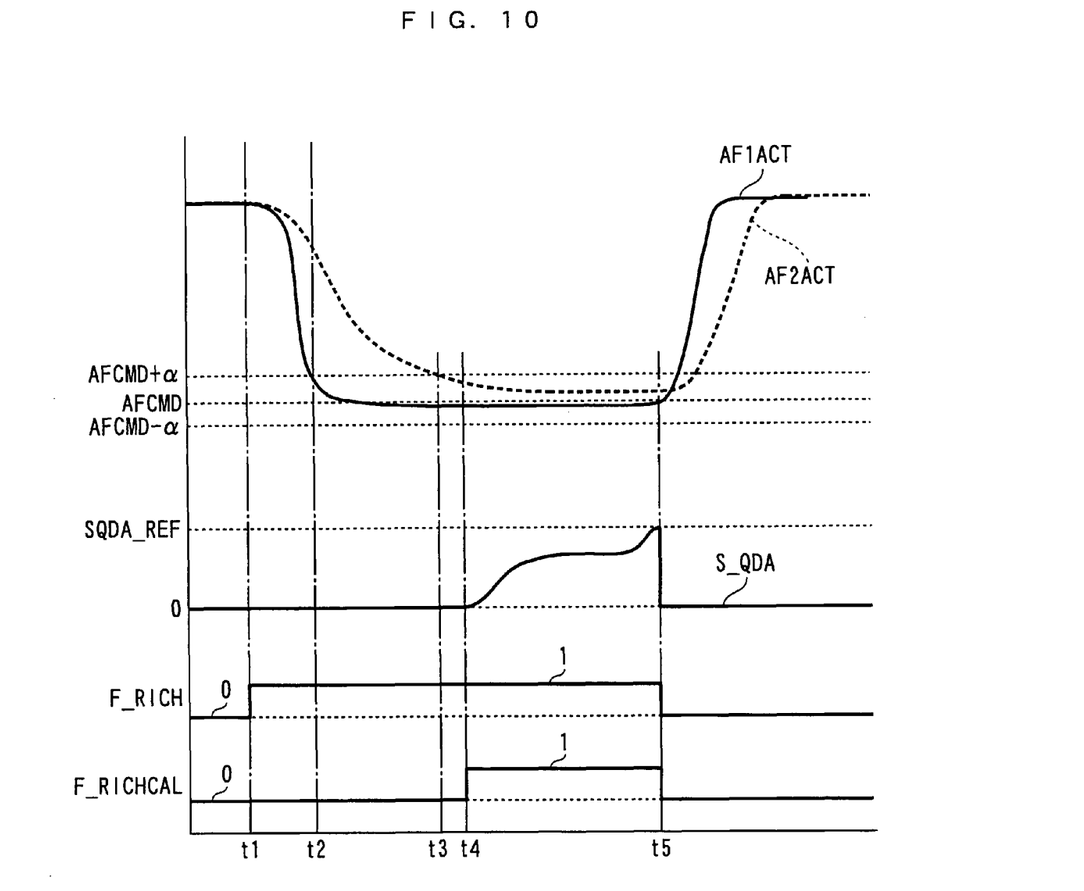
FIG. 10 is a timing diagram showing an example of operation of rich spike control executed by the exhaust emission control device according to the embodiment.

FIG. 10 is a timing diagram showing an example of operation of rich spike control executed by the exhaust emission control device according to the present embodiment. As shown in FIG. 10, in the normal operation before a time t1, the first and second actual air-fuel ratios AF1ACT and AF2ACT are equal to each other.

At the time t1, when the conditions for executing rich spike are satisfied, the rich spike flag F_RICH is set to 1 to start rich spike, whereby the air fuel ratio is controlled to a target air fuel ratio richer than the stoichiometric air-fuel ratio. Accordingly, the first actual air-fuel ratio AF1ACT detected at a location upstream of the three-way catalyst 16 drastically drops, and at a time t2, it converges to a vicinity of the target air fuel ratio AFCMD (AFCMD+α). In contrast, at the initial stage of the rich spike, the reducing agent is consumed in the three-way catalyst 16, so that the second actual air-fuel ratio AF2ACT drops later than the first actual air-fuel ratio AF1ACT, and it converges to the vicinity of the target air-fuel ratio AFCMD at a time t3.

As described above, when the second actual air-fuel ratio AF2ACT converges (YES to the step 52), the calculation of the cumulative value S_QEX of the exhaust gas flow amount is started. Then, when the calculated cumulative value S_QEX has reached the exhaust gas flow amount reference value S_QEXREF (t4), the conditions for executing the calculation of the reducing agent are satisfied, whereby the reducing agent calculation flag F_RICHCAL is set to 1, to start the calculation of the cumulative value S_QDA of the reducing agent amount (steps 9 and 10)).

Then, the required amount of reducing agent is supplied to the NOx catalyst 17, and when the cumulative value S_QDA of the reducing agent amount reaches the reducing agent amount reference value S_QDAREF (YES to the step 12), the rich spike is terminated at a time t5 to reset the cumulative value S_QDA of the reducing agent amount, the rich spike flag F_RICH, and the reducing agent calculation flag F_RICHCAL. Thereafter, the engine resumes a normal operation in which the air-fuel ratio is leaner.

It should be noted that the present invention is by no means limited to the embodiment described above, but it can be practiced in various forms. For example, in the above-described embodiment, the time for starting the calculation of the amount of reducing agent is set to timing in which the second actual air-fuel ratio AF2ACT has converged within the vicinity of the target air-fuel ratio AFCMD, this is not limitative, but it may be set to timing in which the difference between the first actual air-fuel ratio AF1ACT and the second actual air-fuel ratio AF2ACT has converged within a predetermined range.

Further, although in the above-described embodiment, as a purified NOx amount parameter indicative of an amount of NOx purified, i.e. reduced, the cumulative value S_QDA of the reducing agent amount is used, any other suitable parameter may be used. For example, the amount of reducing agent consumed in the NOx catalyst 17 for reduction of NOx may be calculated, and be used as the purified NOx amount parameter. Further, the amount of purified NOx may be directly estimated for use.

Further, although in the above-described embodiment, during the rich spike, the reducing agent is supplied by increasing the fuel injection amount by the injector 6, this is not limitative, but another injector may be disposed in an exhaust port of the exhaust pipe 5 so as to directly inject reducing agent into exhaust gases, by way of example. Further, in the present embodiment, as a predetermined time period to elapse after the convergence of the second actual air-fuel ratio AF2ACT before the start of the calculation of the reducing agent amount, there is used a time period to elapse before the cumulative value S_QEX of the exhaust gas flow amount reaches the exhaust gas flow amount reference value S_QEXREF, this is not limitative, but the wait time may be counted by a timer. Furthermore, the present invention may be applied not only to the diesel engine installed on a vehicle but also to a gasoline engine, such as a lean burn engine. Further, the present invention can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, for purifying exhaust gases emitted from the engine into an exhaust system, comprising:
   a catalyst that is disposed in the exhaust system, for purifying exhaust gases;
   a NOx catalyst that is disposed in the exhaust system at a location downstream of the catalyst, for trapping NOx contained in the exhaust gases under an oxidizing atmosphere, and reducing the trapped NOx under a reducing atmosphere to thereby purify the trapped NOx;
   an air-fuel ratio sensor that is disposed between said catalyst and said NOx catalyst in the exhaust system, for detecting an air-fuel ratio of the exhaust gases;
   NOx reduction control means for causing said NOx catalyst to carry out an operation for reducing NOx, by supplying a reducing agent to an upstream side of said catalyst to control the exhaust gases flowing into said NOx catalyst such that the exhaust gases form the reducing atmosphere;
   purified NOx amount parameter-calculating means for calculating a purified NOx amount parameter indicative of an amount of NOx purified in said NOx catalyst, so as to determine a time at which reduction control by said NOx reduction control means should be terminated;
   exhaust gas flow amount-calculating means for calculating a flow amount of exhaust gases emitted from the engine;
   total exhaust gas inflow amount-calculating means for calculating, based on the calculated exhaust gas flow amount, a total amount of exhaust gases flowed into said NOx catalyst in a state where the detected air-fuel ratio converges within a vicinity of a predetermined target air-fuel ratio, as a total exhaust gas inflow amount; and
   calculation start means for causing calculation of the purified NOx amount parameter to be started by said purified NOx amount parameter-calculating means upon lapse of a predetermined time period after the detected air-fuel ratio converges within the vicinity of the predetermined target air-fuel ratio.

2. An exhaust emission control method of purifying exhaust gases emitted from an internal combustion engine into an exhaust system thereof, the engine including the exhaust system, a catalyst that is disposed in the exhaust system, for purifying exhaust gases, a NOx catalyst that is disposed in the exhaust system at a location downstream of the catalyst, for trapping NOx contained in the exhaust gases under an oxidizing atmosphere, and reducing the trapped NOx under a reducing atmosphere to thereby purify the trapped NOx, and an air-fuel ratio sensor that is disposed between the catalyst and the NOx catalyst of the exhaust system, for detecting an air-fuel ratio of the exhaust gases, an exhaust gas flow amount calculator, and a total exhaust gas amount calculator for calculating, based on the calculated exhaust gas flow amount, a total amount of exhaust gases that has flowed into the NOx catalyst in a state where the detected air-fuel ratio converges within a vicinity of a predetermined target air-fuel ration, as a total exhaust gas inflow amount, the exhaust emission control method comprising:
   a NOx reduction control step of causing the NOx catalyst to carry out an operation for reducing NOx, by supplying a reducing agent to an upstream side of the catalyst to control the exhaust gases flowing into the NOx catalyst such that the exhaust gases form the reducing atmosphere;
   a purified NOx amount parameter-calculating step of calculating a purified NOx amount parameter indicative of an amount of NOx purified in the NOx catalyst, so as to determine a time at which reduction control in said NOx reduction control step should be terminated;
   an exhaust gas flow amount calculating step of calculating a flow amount of exhaust gases emitted from the engine;
   a total amount of exhaust gases flowed calculating step of calculating, based on the calculated exhaust gas flow amount, a total amount of exhaust gas that has flowed into the NOx catalyst in a state where the detected air-fuel ratio converges within a vicinity of a predetermined target air-fuel ratio, as a total exhaust gas inflow amount; and
   a calculation start step of causing calculation of the purified NOx amount parameter to be started in said purified NOx amount parameter-calculating step upon lapse of a predetermined time period after the detected air-fuel ratio converges within the vicinity of the predetermined target air-fuel ratio.

3. An engine control unit including a control program for causing a computer to execute an exhaust emission control method of purifying exhaust gases emitted from an internal combustion engine into an exhaust system thereof, the engine including the exhaust system, a catalyst that is disposed in the exhaust system, for purifying exhaust gases, a NOx catalyst that is disposed in the exhaust system at a location downstream of the catalyst, for trapping NOx contained in the exhaust gases under an oxidizing atmosphere, and reducing the trapped NOx under a reducing atmosphere to thereby purify the trapped NOx, and an air-fuel ratio sensor that is disposed between the catalyst and the NOx catalyst of the exhaust system, for detecting an air-fuel ratio of the exhaust gases, an exhaust gas flow amount calculator, and a total exhaust gas amount calculator for calculating, based on the calculated exhaust gas flow amount, a total amount of exhaust gases that has flowed into the NOx catalyst in a state where the detected air-fuel ratio converges within a vicinity of a predetermined target air-fuel ration, as a total exhaust gas inflow amount, wherein the control program causes the computer to cause the NOx catalyst to carry out an operation for reducing NOx, by supplying a reducing agent to an upstream side of the catalyst to control the exhaust gases flowing into the NOx catalyst such that the exhaust gases form the reducing atmosphere, calculate a purified NOx amount parameter indicative of an amount of NOx purified in the NOx catalyst, so as to determine a time at which reduction control should be terminated, calculate a flow amount of exhaust gases emitted from the engine, calculate, based on the calculated exhaust gas flow amount, a total amount of exhaust gas that has flowed into the NOx catalyst in a state where the detected air-fuel ratio converges within a vicinity of a predetermined target air-fuel ratio, as a total exhaust gas inflow amount, and cause calculation of the purified NOx amount parameter to be started upon lapse of a predetermined time period after the detected air-fuel ratio converges within the vicinity of the predetermined target air-fuel ratio.

* * * * *